United States Patent [19]

Boothe et al.

[11] Patent Number: 5,227,703
[45] Date of Patent: Jul. 13, 1993

[54] PROTECTION SYSTEM FOR ALTERNATING CURRENT, BATTERY POWERED ELECTRIC TRACTION MOTOR VEHICLE

[75] Inventors: Richard W. Boothe; Charles E. Konrad, both of Roanoke, Va.

[73] Assignee: General Electric Company, Salem, Va.

[21] Appl. No.: 871,929

[22] Filed: Apr. 21, 1992

[51] Int. Cl.$^5$ .............................................. H02P 5/40
[52] U.S. Cl. ..................................... 318/139; 318/434; 318/799
[58] Field of Search ............... 318/434, 139, 798, 60, 318/812, 803, 254, 799; 388/819, 823, 903, 311, 907.5

[56] References Cited

U.S. PATENT DOCUMENTS

| | | | |
|---|---|---|---|
| 3,569,810 | 3/1971 | Thiele | 318/434 |
| 3,868,554 | 2/1975 | Konrad | 318/434 |
| 4,292,531 | 9/1981 | Williamson | 318/798 |
| 4,495,449 | 1/1985 | Black et al. | 318/60 |
| 4,667,480 | 5/1987 | Bessler | 318/254 |

*Primary Examiner*—William M. Shoop, Jr.
*Assistant Examiner*—John W. Cabeca
*Attorney, Agent, or Firm*—Bell, Seltzer, Park & Gibson

[57] ABSTRACT

A battery powered traction vehicle propulsion system uses an alternating current (AC) adjustable speed electric traction motor to propel the vehicle. The motor is connected to a source of controllable AC power that is responsive to a control signal for setting the value of power applied to the motor. A function generator produces the control signal in response to a command signal and limits the rate of change of the control signal and its minimum and maximum values. The minimum and maximum values are varied in response to preselected operating characteristics of the propulsion system, such as, for example, battery voltage, motor temperature, motor and vehicle speed and control system temperature.

11 Claims, 2 Drawing Sheets

PROTECTION SYSTEM FOR ALTERNATING CURRENT, BATTERY POWERED ELECTRIC TRACTION MOTOR VEHICLE

BACKGROUND OF THE INVENTION

The present invention relates generally to the operation of alternating current motors and, more particularly, to a protection system for alternating current propulsion systems for battery powered vehicles.

The Government of the United States of America has rights in this invention pursuant to Contract Number DE-AC07-90ID13019 awarded by the U.S. Department of Energy.

Battery powered vehicles have generally utilized direct current (DC) electric motors for propulsion. Recently, the use of alternating current (AC) motors for such applications has become possible, taking advantage of the better power-to-weight ratio of AC motors along with improved efficiency and reduced maintenance requirements. Some of these vehicles have begun to rival or exceed the performance of equivalent internal combustion powered vehicles. However, the higher power density of the AC motor propelled vehicles leads to higher power dissipation and rapid temperature rises during transient operation at peak power. It is therefore desirable to provide an effective protection system for components in the propulsion system of such vehicles.

One example where protection is needed is in the use of a high speed AC motor incorporated in a transaxle assembly for propelling a vehicle. The motor is normally sprayed with transmission fluid for cooling and can generate about one hundred horsepower from a 130 pound motor for intermittent acceleration or hill climbing. Such a motor would normally be called upon to produce about 15 horsepower to maintain 60 miles per hour on level terrain. If the motor is operated at peak power for an extended period, it may overheat and fail. Further, if motor speed drops significantly under such loading, the cooling fluid may not be adequately sprayed over the motor resulting in a higher rate of heating. The slower speed of the motor may further result in higher currents being drawn and risking damage to the electronic components supplying power to the motor.

SUMMARY OF THE INVENTION

In accordance with one form of the present invention, there is provided a protection system for an AC electric traction motor propulsion system which monitors a plurality of selected variables and limits the power available to the motor as a function of the most restrictive of the variables. The propulsion system includes a battery, a controllable inverter coupled to the battery for converting DC power to AC power for application to the motor and a motor regulator for controlling the inverter in a manner to regulate torque from the motor to a commanded value. The system further includes monitors for observing battery voltage, motor temperature, inverter temperature and motor speed. Each of these variables is compared to a preselected limit value and the monitors provide output signals representative of the amount by which each variable exceeds the corresponding limit value. The monitor output signals are coupled to a signal select circuit which selects the most restrictive of the signals for controlling the motor regulator. A torque command signal is processed through a function generator before being applied to the regulator. The function generator forces the command signal to ramp up or down and avoids application of step-function signals to the regulator. The function generator also includes minimum and maximum limits which can be varied in response to signals from the signal select circuit. The signal select circuit thus modifies the power command signal to a restrictive value determined by the system monitors.

BRIEF DESCRIPTION OF THE DRAWINGS

For a better understanding of the present invention, reference may be had to the following detailed description taken in conjunction with the accompanying drawings in which.

DETAILED DESCRIPTION

Figure 1:
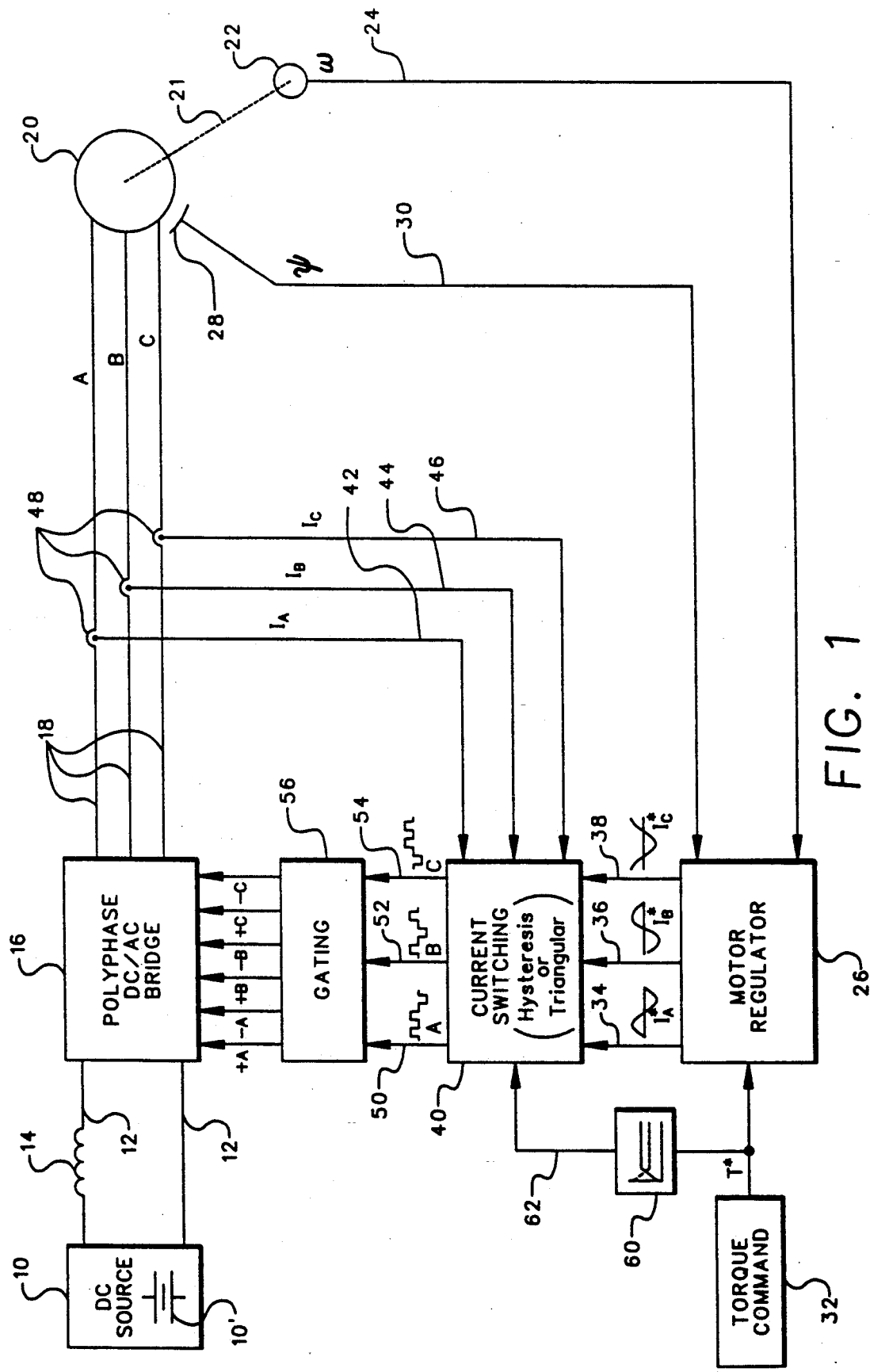
FIG. 1 illustrates one form of propulsion system for an AC electric traction vehicle.

FIG. 1 illustrates in major block diagram form a propulsion system with which the present invention may be used. As shown in FIG. 1 there is provided a source of direct current (DC) power 10. In the primary illustrative embodiment of an on-road electric vehicle, this source would be comprised of a battery, as indicated at 10'. The DC power is applied via a DC bus 12 to a polyphase DC/AC power conversion bridge 16. Included in DC bus 12 is an inductor 14 representative of distributed line inductance.

The DC/AC bridge 16 may be of the well known configuration. In the illustrative embodiment here being considered, it is a three phase bridge of the six step type operated in a PWM mode. The bridge is preferably comprised of any suitable semiconductor devices such as insulated gate bipolar transistors (IGBT), MOS controlled thyristors (MCT), field effect transistors (FET) or gate turn-off thyristors all as well known in the art and all of which, in the present state of the art, have associated fast recovery inverse paralleled diodes.

The output of the bridge 16 is applied via an AC bus 18 to an AC motor 20. The three phases are indicated as A, B and C as is customary in the art. Motor 20 is preferably an induction motor or a synchronous motor. Associated with the motor, as indicated by the dashed line 21, is a tachometer 22 which provides an output signal $\omega$ on line 24 to a motor regulator 26. The value of the $\omega$ signal is representative of motor speed. Also provided to the motor regulator 26 is a signal $\psi$ representing motor flux. As illustrated in FIG. 1 the $\psi$ signal is derived from a suitable means such as a flux coil 28 associated with the motor 20 which is here included solely to illustrate one means to determine motor flux.

The third input to the motor regulator 26 is a signal T*, a torque command signal, from a suitable source 32. The value of the T* signal represents the value of desired motor output torque. The nature of the torque command block 32 is more fully set forth in FIG. 2 in discussion of the present invention and is responsive to various input and feedback signals to develop the signal. In the present example of an electric vehicle, the torque command 32 might function in response to accelerator pedal position to develop the T* signal.

The outputs of the motor regulator 26, appearing on lines 34, 36 and 38 are replicas of the desired phase currents to be supplied to the motor. These are designated, respectively, as $I_A{}^*$, $I_B{}^*$ and $I_C{}^*$. These three signals are applied to a current switching block 40 which also receives current signals via lines 42, 44 and 46. These signals, which are respectively designated $I_A$, $I_B$ and $I_C$, are derived by suitable means such as current sensors 48 in the lines of the AC bus and are signals proportional to actual phase currents furnished to the motor 20. Current switching block 40 responds to the six current related input signals and to an additional input (line 62), to be described, to provide output signals on lines 50, 52 and 54. These latter output signals are the basic switching signals for three phases of bridge 16. The actual gating signals are developed in a standard commercial integrated chip known as IXDP630 by IXYS Corporation of San José, Calif. (block 56), and these gating signals are provided to the positive and negative portions of the bridge as indicated by the plus and minus designations of the three phases A, B and C.

The description thus far relates to that which is well known in the art. The bridge 16, as earlier indicated, would normally be a six step semiconductor inverter operating in a pulse-width-modulated mode. The motor regulator 26 could also be of any convenient type such as a "controlled slip" or "field oriented" controller. The current switching block 40 as will be further discussed preferably provides either hysteresis or triangular type switching. If further information is desired relative to any of these components attention is called to the book Power Electronic Control of AC Motors by J. M. D. Murphy and F. G. Turnbull, Pergamon Press, copyright 1988, Library of Congress Cataloging in Publication Data TK2781.M87 1988 621.46' 2 88-6031.

The present invention includes the just described type of drive taken in conjunction with the block 32 and its effect upon the system. As shown in FIG. 1 the torque command signal T* is applied to a function block 60 the output of which (line 62) is applied to the current switching block 40. Two types of functions are indicated in block 60. The first, shown in solid line, is applicable to a hysteresis type switching while that shown by the dashed line is applicable to a triangular type switching system, both which, as was previously indicated, are described in the aforementioned reference. For a more complete description of the application of block 60 and its use with respect to the two types of switching, reference is made to U.S. patent application Ser. No. 07/837,467 "Method and Apparatus For Improved Efficiency in a Pulse-Width Modulated Alternating Current Motor Drive" by C. E. Konrad and R. W. Boothe, filed Feb. 14, 1992, which application is assigned to the assignee of the present invention and which is specifically incorporated herein by reference.

Figure 2:
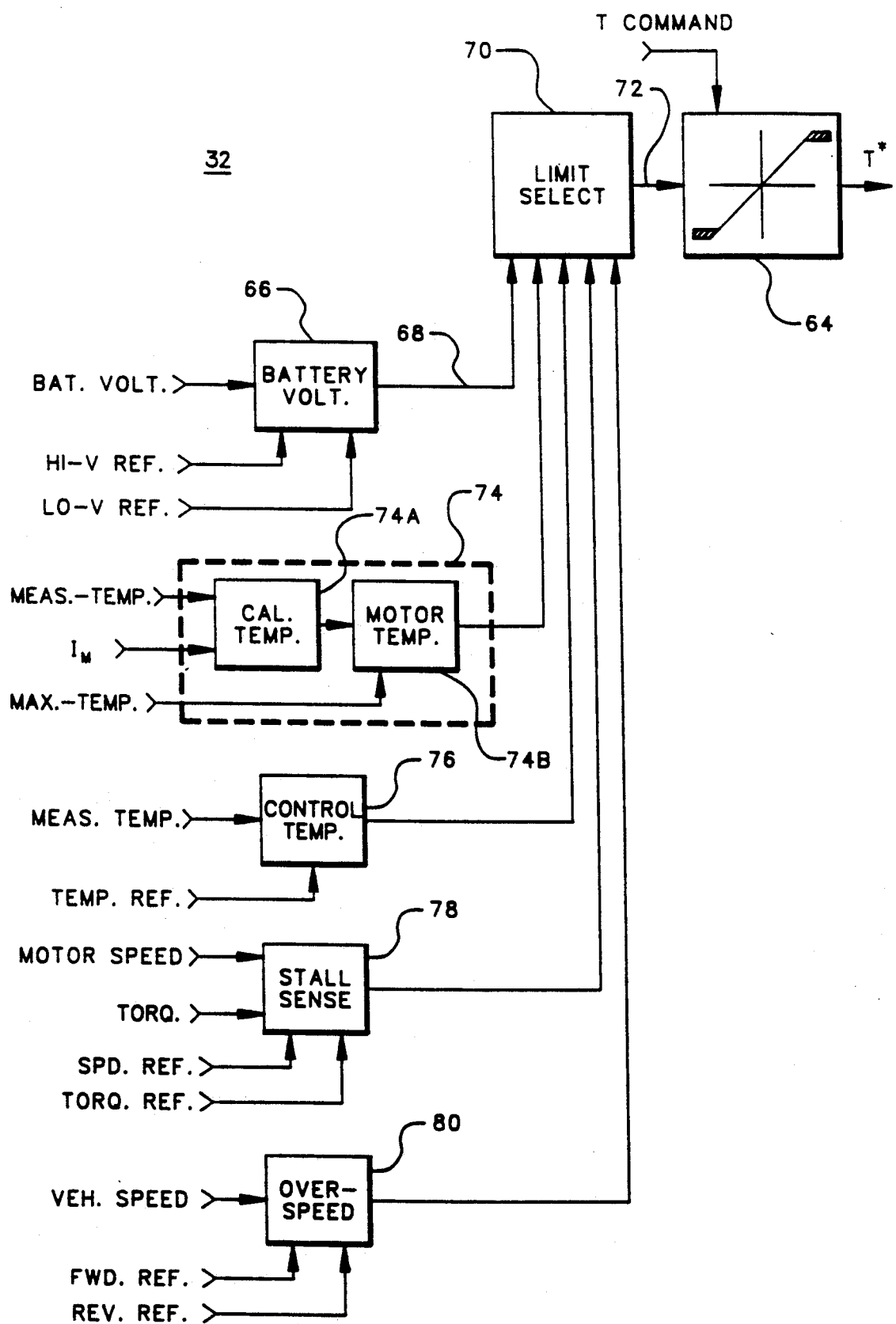
FIG. 2 is a simplified block diagram of a monitoring and control system for use in the system of FIG. 1.

The torque command block 32 is shown in more detail in FIG. 2. A torque command signal, which may be accelerator position or brake position depending upon whether the system is in a propulsion mode or a regenerative braking mode, is applied to block 32 and, more particularly, to a function generator 64. The function generator 64 limits the rate of change of the torque command signal to a preselected value, i.e., the rate of change of the torque command signal is forced to track a selected ramp function indicated by the graph in block 64. For example, if the torque signal T* is at a different level than the torque commanded, the signal T* is moved towards the commanded torque at a constant pound-foot per second rate. Generator 64 also places maximum positive and negative limits on the output torque signal T*, the limits being positive or negative depending upon whether the system is in propulsion or electrical braking. If the commanded torque is greater than the maximum or clamp values, the output T* will remain at a clamped value until the commanded torque drops below the clamp value. In accordance with the present invention, the maximum limits are varied in response to measured or calculated conditions of the propulsion system, as indicated by the cross-hatched area at each end of the graph in block 64.

Block 66 represents a battery voltage monitor for assuring that battery voltage (BAT. VOLT) is not caused to exceed an upper limit, e.g., 385 volts (HI-V REF), or to fall below a lower limit, e.g., 195 volts (LO-V REF). Without protection, the upper limit can be exceeded when the vehicle is operated in a regenerative braking mode. The lower limit is desirable since acceleration at low battery state-of-charge may result in malfunction of the system due to a severe battery voltage drop under load. The monitor 66 compares upper and lower set point values (370 and 210 volts, respectively) to measured battery terminal voltage. If the measured voltage falls outside the set point values, the allowable torque T* is reduced by 10 pound-feet per volt outside the set point values. These values are selected to reduce T* to zero at the upper and lower battery voltage limits.

It will be noted that the monitor 66 provides a torque limit reduction signal via line 68 to a selection circuit 70. The selection circuit 70 has a plurality of input terminals and functions to select the most restrictive of the signals on its input terminals as an output signal coupled onto line 72. Line 72 couples the output signal to function generator 64. In its simplest form, the selection circuit may comprise a first plurality of diodes for processing positive signals and a second plurality of diodes for processing negative signals. Monitor 66 may comprise a conventional form of comparison circuit, implemented either in analog form or in digital form.

A second function which is desirably monitored in the AC motor system is motor temperature. Block 74 represents a motor temperature monitor used to prevent overtemperature of the traction motor 20. In addition to a set point reference or maximum temperature limit (MAX-TEMP), block 74 receives a first signal representative of a measured motor temperature (MEAS-TEMP) and a second signal representative of motor current ($I_M$) The MEAS-TEMP signal and the $I_M$ signal are utilized to calculate the temperature at the center of a motor stator slot, i.e., at a location believed to be the hottest spot in the motor 20. More particularly, at block 74A, a CAL-TEMP signal is computed from the MEAS-TEMP and $I_M$ signals, the CAL-TEMP signal being representative of the motor hot-spot temperature. Although this hot-spot temperature could be measured directly by positioning a probe in a stator slot, it has been found that stator temperature can be calculated with sufficient accuracy by adding motor end-turn temperature to a motor current proportional value which may be merely the square of the current value multiplied by a constant.

The desirability of obtaining the motor hot-spot temperature can be appreciated by considering that the most accessible part of the motor 20 is the end-turns of the motor stator windings and that temperature sensors can be relatively easily embedded in the end-turns. Further, it is the winding insulation which is generally first to fail in an induction motor due to excessive temperature rise. However, in the present application, the end-turns represent the coolest spot in the motor 20 since the motor is located in the transaxle assembly and the end-turns are flooded with transmission fluid, the fluid being the principal means of heat removal from the motor. About one third of the stator winding length is in the end-turns and the remaining two-thirds is located in the motor stator slots. Power loss in the stator winding per unit length is constant so that two-thirds of such loss (in the form of heat) occurs in the stator slots. This heat is conducted transversely through the stator core to the end-turn area where it is transferred to the transmission fluid to cool the stator. Since the lowest temperature is at the end-turn area, the hottest spot is at the mid-point of the stator slots.

Calculation of the mid-slot stator temperature is based upon the difference in temperature between the end-turns and the stator mid-slot being the product of the thermal impedance between the stator mid-slot and the end-turns multiplied by the power dissipated in the stator winding (stator resistance times the square of stator (motor) current). The stator resistance is a function of temperature of the stator windings so the resistance value used in the computation is continually adjusted for a temperature that is preferably half-way between the last measured end-turn temperature and the last calculated hot-spot temperature. The calculated temperature value is obtained by summing the calculated product described above with the measured end-turn temperature in block 74A.

The calculated hot-spot temperature (CAL-TEMP) is compared to a temperature limit value (MAX-TEMP) in block 74B. A typical value of MAX-TEMP may be 185° C., and if the CAL-TEMP value exceeds the MAX-TEMP value, the torque limit is reduced by a predetermined rate, e.g., 10 pound-feet per degree C. for each degree above MAX-TEMP. The values of MAX-TEMP and the de-rating function are selected to force motor torque to zero at a predetermined maximum safe operating temperature. For example, for one exemplary motor producing a maximum torque of 150 pound-feet, using 10 lb-ft per degree C. starting at a temperature of 185°, the torque is reduced to zero at a calculated hot-spot temperature of 200° C. As a further precaution, the block 74 limits the maximum torque to a preselected value, e.g., 20 lb-ft, if the measured temperature at the end-turns reaches the maximum safe operating temperature, i.e., 200° C. for the illustrative example. This latter limit is placed on temperature independent of stator current.

As with block 66, the limiting signal from block 74 is coupled to one of the input terminals of selection circuit 70.

A third function which is monitored in the AC motor system is the temperature of the inverter 16 and, in particular, the temperature of the power electronic switches in the inverter. Block 76 represents an over-temperature monitor for inverter 16 and may include a thermistor (not shown) positioned adjacent the switches in the inverter. If the inverter temperature (MEAS.-TEMP) rises above a preselected set point (TEMP.REF), for example, 90° C., the block 76 provides a signal to generator 64 to reduce the allowed torque at a preselected rate, e.g., 10 pound-feet per degree C. Generally, the rate is selected to reduce torque to zero at some critical temperature limit, e.g., 115° C. in an exemplary PWM control. As with blocks 66 and 74, the signal from block 76 is processed through selection circuit 70.

A fourth function desirably monitored is motor stall condition. As previously discussed, the AC motor 20 is preferably installed in a transaxle assembly and relies on splashing of the fluid in the assembly to uniformly cool the motor. This in turn requires that the motor be driving the assembly at at least some minimum speed. Below the minimum speed, hot spots can quickly develop. Thus, a stall condition, which can result if motor torque is used to hold the vehicle from rolling backward on a grade while waiting for a traffic signal, may result in damage to the motor. The stall protect function block 78 gradually reduces the maximum allowable torque at a preselected rate when motor speed drops below a set point value (SPD.REF) and torque is greater than another set point (TORQ.REF). For example, torque may be reduced at a rate of 2 pound-feet per second when motor speed is below 2 miles per hour and torque is greater than 20 pound-feet. The limit may be raised at the same rate whenever the condition is terminated by a requested torque of less than 20 pound-feet or by speed increasing above 2 MPH. The signal from block 78 is coupled through selection circuit 70 to function generator 64.

A fifth desirably monitored function in AC motor systems is maximum motor speed. In order for AC motor 20 to achieve a high power-to-weight ratio, it is necessary to operate at very high speeds, e.g., the motor speed may be 13000 RPM for a vehicle speed of 75 MPH. At some higher speeds, the centrifugal forces on the rotor bars of the motor 20 may be sufficient to cause them to rise and scrape on the stator surface thereby damaging the motor (this speed is sometimes referred to as the maximum design operating speed). A maximum overspeed set point is selected which is sufficiently less than the maximum design limit to provide a margin of protection. The block 80 represents an overspeed monitor which implements an overspeed limit function to reduce motor torque at a preselected rate whenever vehicle speed (VEH.SPEED) exceeds a preselected velocity (FWD.REF). For example, torque limit may be reduced at a rate of 10 pound-feet per MPH above 70 MPH when the vehicle is in a forward drive mode. If the vehicle is in reverse, other limits (REV.REF) may be selected, such as, for example, 10 pound-feet per MPH in excess of 20 MPH. The limit signal developed by block 80 is coupled to selection circuit 70 for application to function generator 64.

Each of the function blocks 64, 66, 74, 76, 78 and 80 may be implemented in analog form or in a microcomputer. The implementation of such limit functions as described is within the ordinary skill in the art. For example, a limit function based on temperature for a DC motor system is shown in U.S. Pat. No. 3,868,554. The use of selection circuits, such as circuit 64, is also known as illustrated by U.S. Pat. No. 4,495,449.

While the invention has been described in what is considered to be a preferred embodiment, various modifications will become apparent to those skilled in the art. Further, the various values cited are to be understood to be for purpose of example only since different motors will have different characteristics. Still further, derivation of each of the measured parameters, e.g., measure temperature, motor speed, vehicle speed, motor torque and battery voltage, may utilize methods well known in the art and disclosure of such varied methods is not believed necessary to an understanding of the invention nor is disclosure of a particular method herein deemed to be limited to such method. It is intended therefore that the invention not be limited to the illustrative embodiment but be interpreted within the full spirit and scope of the appended claims.

What is claimed is:

1. A battery powered traction vehicle propulsion system comprising at least one alternating current (AC) adjustable speed electric traction motor, which can propel the vehicle, being connected to a source of controllable AC power that is responsive to a control signal for setting the value of power applied to the motor, and a function generator for producing the control signal in response to a command signal, said generator limiting the rate of change of the control signal and minimum and maximum values thereof, said minimum and maximum values being selectively variable in response to at least two preselected operating characteristics of the propulsion system in a manner whereby the maximum and minimum values are varied in response to that characteristic requiring the most restrictive motor operation.

2. The system of claim 1 further including a battery and wherein one of said preselected operating characteristics comprises battery voltage, the system including a battery voltage monitor having selectable upper and lower voltage limits, said monitor providing a signal to said function generator for varying one of said minimum and maximum values toward zero in response to battery voltage becoming, respectively, less than or greater than said lower and upper limits.

3. The system of claim 2 wherein said minimum and maximum limits are varied in proportion to the amount by which the battery voltage falls outside said lower and upper limits, respectively.

4. The system of claim 1 wherein one of said preselected operating characteristics comprises motor temperature, the system including a motor temperature monitor for comparing a calculated motor temperature and a measured motor temperature to preselected temperature limits, said motor temperature monitor providing a signal to said function generator for varying said minimum and maximum values toward zero at a preselected rate when either said calculated or said measured temperature exceeds said temperature limits.

5. The system of claim 4 wherein another of said preselected operating characteristics comprises temperature of the controllable power source, the system including a control temperature monitor for comparing measured power source temperature to a preselected maximum limit and for providing a signal to said function generator for varying one of said minimum and maximum values toward zero at a preselected rate when source temperature exceeds said maximum limit.

6. The system of claim 1 wherein one of said preselected operating characteristics comprises motor speed, the system including a motor speed monitor for reducing said maximum value when motor speed is less than a preselected value and torque is greater than a preselected value, said speed monitor generating a signal to said function generator for reducing said maximum value in proportion to the time the speed is less than said preselected value and said torque is greater than said preselected value.

7. The system of claim 6 wherein said speed monitor further compares motor speed to a preselected maximum speed and provides a signal to reduce said maximum value of said control signal in proportion to the amount by which said motor speed exceeds said maximum speed.

8. The system of claim 1 and including:
a battery voltage monitor having selectable upper and lower voltage limits, said monitor providing a signal to said function generator for varying one of said minimum and maximum values toward zero in response to battery voltage becoming less than or greater than said lower and upper limits, respectively;

a motor or temperature monitor for comparing a calculated motor temperature and a measured motor temperature to preselected temperature limits, said motor temperature monitor providing a signal to said function generator for varying said minimum and maximum values toward zero at a preselected rate when either said calculated or said measured temperature exceeds said temperature limit;

a control temperature monitor for comparing measured power source temperature to a preselected maximum limit and for providing a signal to said function generator for varying one of said minimum and maximum values toward zero at a preselected rate when source temperature exceeds said maximum limit;

and selection means for receiving each of said signals from said battery voltage monitor, said motor temperature monitor and said control temperature monitor, said selection means selecting a most restrictive signal from said received signals for application to said function generator for varying said maximum and minimum values.

9. In a battery powered electric traction vehicle propulsion system comprising at least one alternating current (AC) adjustable speed electric traction motor which can propel the vehicle, the motor being connected to a source of controllable AC power that is responsive to a control signal for setting the value of power applied to the motor, the improvement comprising:

a function generator for producing the control signal in response to a command signal, said generator limiting the rate of change of the control signal and minimum and maximum values thereof, said minimum and maximum values being variable in response to preselected operating characteristics of the propulsion systems;

a battery voltage monitor having selectable upper and lower voltage limits, said monitor providing a signal to said function generator for varying one of said minimum and maximum values toward zero in response to battery voltage becoming less than or greater than said lower and upper limits, respectively;

a motor temperature monitor for comparing a calculated motor temperature and a measured motor temperature to preselected temperature limits, said motor temperature monitor providing a signal to said function generator for varying said minimum and maximum values toward zero at a preselected rate when either said calculated or said measured temperature exceeds said temperature limit;

a control temperature monitor for comparing measured power source temperature to a preselected maximum limit and for providing a signal to said function generator for varying one of said minimum and maximum values toward zero at a preselected rate when source temperature exceeds said maximum limit;

and selection means for receiving each of said signals from said battery voltage monitor, said motor temperature monitor and said control temperature monitor, said selection means selecting a most restrictive signal from said received signals for application to said function generator for varying said maximum and minimum values.

10. The improvement of claim 9 and including:

a motor speed monitor for reducing said maximum value when motor speed is less than a preselected value and torque is greater than a preselected value, said speed monitor generating a signal to said function generator for reducing said maximum value in proportion to the time the speed is less than said preselected value and said torque is greater than said preselected value.

11. The improvement of claim 10 wherein said speed monitor further compares motor speed to a preselected maximum speed and provides a signal to reduce said maximum value of said control signal in proportion to the amount by which said motor speed exceeds said maximum speed.

* * * * *